United States Patent
Zhang et al.

(10) Patent No.: US 11,196,374 B2
(45) Date of Patent: Dec. 7, 2021

(54) MODELING METHOD OF STATOR WINDING AIR GAP FOR TEMPERATURE FIELD ANALYSIS OF AC TRACTION MOTOR

(71) Applicant: Hunan University of Science and Technology, Hunan (CN)

(72) Inventors: Xiaoping Zhang, Hunan (CN); Ping Liu, Hunan (CN); Sijian Kuang, Hunan (CN); Zhu Zhang, Hunan (CN)

(73) Assignee: Hunan University of Science and Technology, Xiangtan (CN)

( * ) Notice: Subject to any disclaimer, the term of this patent is extended or adjusted under 35 U.S.C. 154(b) by 0 days.

(21) Appl. No.: 17/037,873

(22) Filed: Sep. 30, 2020

(65) Prior Publication Data

US 2021/0013820 A1 Jan. 14, 2021

Related U.S. Application Data

(63) Continuation of application No. PCT/CN2019/122279, filed on Nov. 30, 2019.

(30) Foreign Application Priority Data

Jan. 10, 2019 (CN) .......................... 201910023474.0

(51) Int. Cl.
*H02P 7/00* (2016.01)
*H02P 23/14* (2006.01)
(Continued)

(52) U.S. Cl.
CPC .............. *H02P 23/14* (2013.01); *G06F 30/23* (2020.01); *H02K 3/47* (2013.01)

(58) Field of Classification Search
CPC . H02K 3/47; H02K 3/12; H02K 3/345; G06F 30/23; G06F 17/00; G06F 2119/08; H02P 29/64; H02P 23/14
(Continued)

(56) References Cited

U.S. PATENT DOCUMENTS 8,543,365 B1 9/2013 Petro et al.
2004/0206341 A1* 10/2004 Clarkson ................ F02B 39/10
123/564

(Continued)

FOREIGN PATENT DOCUMENTS

CN 106096157 A 11/2016
CN 107844647 A 3/2018
(Continued)

OTHER PUBLICATIONS

Modeling and Performance Optimization of Permanent Magnet Starter Motor Base on Ansoft; Zhuang, Shengxian.

*Primary Examiner* — Kawing Chan
*Assistant Examiner* — Gabriel Agared

(57) ABSTRACT

A modeling method of a stator winding air gap for temperature field analysis of an AC traction motor includes: changing the width of an air gap of a stator winding equivalent model according to a set value of spacing; establishing a three-dimensional finite element model of the AC traction motor with the stator winding air gap; based on the three-dimensional finite element model of different widths of the air gap, analyzing a temperature field to obtain a temperature field distribution diagram of the AC traction motor; carrying out the numerical fitting according to data in the temperature distribution diagram to obtain a function relation between the air-gap width and the temperature of the stator winding equivalent model; and by measuring the actual temperature of a motor stator winding, calculating an optimal air-gap width corresponding to the modeling of the stator winding of the current AC traction motor.

9 Claims, 5 Drawing Sheets

(51) Int. Cl.
*G06F 30/23* (2020.01)
*H02K 3/47* (2006.01)
(58) Field of Classification Search
USPC .......................................................... 318/432
See application file for complete search history.

(56) References Cited

U.S. PATENT DOCUMENTS

| | | | |
|---|---|---|---|
| 2006/0220602 A1* | 10/2006 | Wang ....................... | H02P 6/185 318/400.04 |
| 2006/0250154 A1* | 11/2006 | Gao ..................... | G01R 31/343 324/765.01 |
| 2012/0007532 A1* | 1/2012 | Baglino .................. | H02P 21/14 318/473 |
| 2014/0097704 A1* | 4/2014 | Cavallera ............... | H02H 9/005 307/125 |
| 2015/0347670 A1* | 12/2015 | James ..................... | F16H 57/00 703/2 |
| 2017/0228340 A1 | 8/2017 | Remus | |
| 2019/0114385 A1* | 4/2019 | Cheng ..................... | G06F 30/23 |

FOREIGN PATENT DOCUMENTS

| | | | |
|---|---|---|---|
| CN | 107885955 A | 4/2018 | |
| CN | 108733887 Y | 11/2018 | |
| CN | 109753737 A | 5/2019 | |

* cited by examiner

MODELING METHOD OF STATOR WINDING AIR GAP FOR TEMPERATURE FIELD ANALYSIS OF AC TRACTION MOTOR

CROSS-REFERENCE TO RELATED APPLICATIONS

This application is a continuation of International Patent Application No. PCT/CN2019/122279, filed on Nov. 30, 2019, which claims the benefit of priority from Chinese Patent Application No. 201910023474.0, filed on Jan. 10, 2019. The content of the aforementioned applications, including any intervening amendments thereto, is incorporated herein by reference.

TECHNICAL FIELD

The present invention relates to the field of temperature field analysis of an AC traction motor, and particularly relates to a modeling method of a stator winding air gap for temperature field analysis of the AC traction motor.

BACKGROUND OF THE PRESENT INVENTION

AC traction motors have been widely used in various fields because of the advantages such as simple structure, reliable operation, firmness, durability, large power and high rotation speed. The temperature inside the AC traction motor is increased due to various losses during the operation. If the temperature is too high, the service life of the motor may be seriously affected. Therefore, the temperature field inside the motor is analyzed to instruct the optimized design of the motor structure, which has important significance for lowering the temperature of the motor.

In the prior art, since the temperature distribution condition of all units inside the motor can be accurately reflected by adopting the finite element method to analyze the temperature field of the AC traction motor, and the analysis result is accurate, the finite element method has been widely used. However, when the finite element method is used to analyze the temperature field of the AC traction motor, the accuracy requirement for the model is high; and if the finite element model of the motor is established completely according to the actual structure of the motor, there are various problems such as model complexity, long modeling time, large calculation workload and high requirement for the computer performance, so the finite element method is difficult in popularization. Therefore, generally the motor model is properly simplified when the finite element method is actually used to analyze the temperature field of the AC traction motor; and particularly for the air gap in stator windings, due to the irregularity of the air gaps among conducting wires and between a relevant conducting wire and the slot wall of a stator in the windings, the modeling of the winding air gap becomes very difficult. Thus, the air gap is often neglected when in actual modeling. Although this process simplifies the model, the accuracy of the temperature field analysis is affected.

SUMMARY OF THE PRESENT INVENTION

For the above problems of the prior art, the present invention provides a modeling method of a stator winding air gap for the temperature field analysis of an AC traction motor, which is simple in principle, high in algorithm precision and less in occupied system resource.

The technical solutions provided by the present invention are as follows:

The modeling method of the stator winding air gap for the temperature field analysis of the AC traction motor includes: changing the width of an air gap of a stator winding equivalent model according to a set value of spacing, establishing a three-dimensional finite element model of the AC traction motor with the stator winding air gap, based on the three-dimensional finite element model of different air-gap widths, analyzing the temperature field to obtain a temperature field distribution diagram of the AC traction motor, carrying out the numerical fitting according to data in the temperature distribution diagram to obtain a function relation between the air-gap width and the temperature of the stator winding equivalent model, and by measuring the actual temperature of a motor stator winding corresponding to a position on the surface of the equivalent model, calculating an optimal air-gap width corresponding to the modeling of the stator winding of the current AC traction motor.

The air-gap width of the stator winding equivalent model is changed according to the set value of spacing; the three-dimensional finite element model of the AC traction motor with the stator winding air gap is established; and the temperature field distribution diagram of the AC traction motor is obtained by analyzing the temperature field. The temperature field distribution of the AC traction motor under different air-gap widths is solved; the numerical fitting is carried out based on the air-gap width and the corresponding temperature data of the stator winding equivalent model to obtain the function relation between the air-gap width and the temperature of the winding equivalent model; and by measuring the actual temperature of the motor stator winding corresponding to a position on the surface of its equivalent model, the air-gap width corresponding to the actual temperature is calculated. The air-gap width is used as the optimal air-gap width corresponding to the modeling of the stator winding of the current AC traction motor.

The modeling method of the stator winding air gap for the temperature field analysis of the AC traction motor provided by the present invention includes the following steps:

step 1): establishing the stator winding equivalent model according to the structure of the stator winding of the AC traction motor;

step 2): based on the stator winding equivalent model obtained in the step 1, determining the structure and the width of an isolation layer between the model and a slot wall and a slot wedge of a stator iron core;

step 3): determining the structure and the initial width of a corresponding insulation layer and the air gap in the isolation layer according to the structure and the width of the isolation layer obtained in the step 2, and based on the structural parameters of other components of the motor, establishing a three-dimensional finite element model of the AC traction motor;

step 4): carrying out the temperature field analysis based on the three-dimensional finite element model of the AC traction motor obtained in step 3 to obtain the temperature field distribution diagram of the AC traction motor, and selecting the temperature of a position on the surface of the stator winding equivalent model as a to-be-measured value;

step 5): changing the air-gap width of the stator winding equivalent model according to the set value of the spacing, respectively establishing the three-dimensional finite element model of the AC traction motor, solving the temperature field distribution of the AC traction motor under different widths of the air gap, and respectively measuring the temperature of the surface of the stator winding equivalent model corresponding to the position in the step 4;

step 6): carrying out the numerical fitting for N groups of air-gap widths and corresponding temperature data of the stator winding equivalent model obtained in the step 5 to obtain a calculation formula (8) between the air-gap width and the temperature of the stator winding equivalent model:

$$h_1(T) = ae^{bT} + ce^{dT} \qquad (8)$$

in the formula: $h_1(T)$ is a function of the winding air-gap width; T is the temperature of one position on the surface of the winding equivalent model; a, b, c and d are coefficients of the function of the air-gap width; e is a base number of a natural logarithm function; and specifically, a, b, c and d are determined by the least square method;

step (7): measuring the actual temperature of the stator motor winding corresponding to one position on the surface of the equivalent model, substituting the actual temperature into the above calculation formula (8) to obtain the air-gap width corresponding to the actual temperature, wherein the air-gap width is used as the optimal air-gap width corresponding to the modeling of the stator winding of the current AC traction motor.

Preferably, in the step 1, during the modeling, multiple turns of copper wires in the stator winding are equivalent to a single turn of copper wire; a sectional area of the single turn of copper wire is equal to the sectional area of the multiple turns of copper wires, and the sectional shape of the single turn of copper wire is identical to the stator slot shape; and the sectional area of the single turn of copper wire is solved through the formula (1):

$$s_1 = n\pi r_1^2 \qquad (1)$$

In the formula: $s_1$ is the sectional area of the single turn of copper wire, $r_1$ is a radius of each turn of copper wire in the multiple turns of copper wires of the stator winding, and n is the number of turns of the multiple turns of copper wires of the stator winding.

Preferably, in the step 2, the width of the isolation layer between the equivalent model of the stator winding and the slot wall and the slot wedge of the stator iron core is equal everywhere, and the width of the isolation layer is calculated through the formula (2):

$$h = r\left(1 - \sqrt{\frac{s_1}{s_2}}\right) \qquad (2)$$

In the formula: h is the width of the isolation layer, r is the bottom radius of the stator slot, and $s_2$ is the sectional area of the stator slot.

Preferably, in the step 3, the initial width of the corresponding air gap in the isolation layer is set as the equivalent air-gap width of the single layer of copper wire in the stator slot, which is specifically as follows:

$$h_1 = \left(2 - \frac{\pi}{2}\right)r_1 \qquad (3)$$

In the formula: $h_1$ is the initial width of the air gap in the isolation layer.

Preferably, in the step 3, the initial width of the corresponding insulation layer in the isolation layer is:

$$h_2 = h - h_1 \qquad (4)$$

In the formula: $h_2$ is the initial width of the insulation layer in the isolation layer.

Preferably, the specific operation of the step 4 is as follows:

step 4-1): carrying out the grid partitioning for the three-dimensional finite element model of the AC traction motor;

step 4-2): applying a heat source to the three-dimensional finite element model of the AC traction motor after the grid partitioning;

step 4-3): setting boundary conditions and convective heat exchange coefficients of the three-dimensional finite element model of the AC traction motor;

step 4-4): carrying out the finite element calculation of the temperature field for the three-dimensional finite element model to obtain the temperature field distribution diagram of the AC traction motor, and selecting the temperature of one position on the surface of the stator winding equivalent model as the to-be-measured value.

More preferably, the specific operation of the step 4-3 is as follows:

(a) setting the convective heat exchange coefficient among a casing, heat radiating ribs and air as being equal everywhere;

(b) calculating a Reynolds number Re and a critical Reynolds number $Re_l$ of the air gap between a stator and a rotor according to the formula (5) and the formula (6);

$$Re = \pi d_1 \delta \frac{\omega_g}{60\nu} \qquad (5)$$

$$Re_l = 41.2\sqrt{\frac{d_2}{\delta}} \qquad (6)$$

In the formulas: $d_1$ is a radius of the rotor, $d_2$ is a radius of the stator, $\delta$ is a length of the air gap between the stator and the rotor, $\omega_g$ is a rotation speed of the rotor, and $\nu$ is kinematic viscosity of the air;

(c) based on the Reynolds number Re and the critical Reynolds number Re/obtained in step b, determining the corresponding convective heat exchange coefficient, setting the convective heat exchanging coefficient in the air gap between the stator and the rotor as the calculated value, which is specifically as follows:

When Re<$Re_l$, it indicates that the air flow in the air gap is laminar flow, and the convective heat exchange coefficient $\alpha$ is assigned with the heat conducting coefficient of the air;

When Re>$Re_l$, it indicates that the air flow in the air gap is turbulent flow, and the convective heat exchange coefficient $\alpha$ is calculated through the formula (7):

$$\alpha = \frac{0.06 Re^{0.7} \lambda}{\delta} \qquad (7)$$

In the formula: $\lambda$ is the heat conduction coefficient of the air.

Preferably, the set value of the spacing in the step 5 refers to that the value of the spacing is determined by taking the initial width of the air gap as an initial value and the width of the isolation layer as a final value according to the numerical fitting requirement, and the width of the air gap is gradually increased from the initial value to the final value according to the spacing.

Compared with the prior art, the modeling method of the stator winding air gap for the temperature field analysis of the AC traction motor provided by the present invention has the following advantages:

By adopting the modeling method of the stator winding air gap for the temperature field analysis of the AC traction motor provided by the present invention, the accurate model of the stator winding air gap of the AC traction motor can be established, so that the accuracy of the finite element model of the AC traction motor can be effectively improved, and the accuracy of the temperature field analysis of the AC traction motor can be effectively improved, thereby providing beneficial instruction for the optimized design of the structure of the AC traction motor.

LIFT OF REFERENCE NUMERALS

1, stator winding equivalent model; 2, insulation layer 2; 3, air gap between the surface insulation layer of the stator winding equivalent model and a slot wall and a slot wedge of a stator iron core; 4, slot wall; 5, slot wedge; 6, casing; 7, stator iron core; 8, stator wedge portion; 9, rotor conducting bar; 10, rotor iron core; 11, air gap between the stator and the rotor; 12, rotor end ring; 13, bearing; and 14, to-be-measured point.

DETAILED DESCRIPTION OF THE PRESENT INVENTION

Specific embodiments of the present invention are further described below in detail in combination with the accompanying drawings. It shall be understood that the specific embodiments described herein are merely used to explain and interpret the present invention, rather than limiting the present invention.

Figure 1:
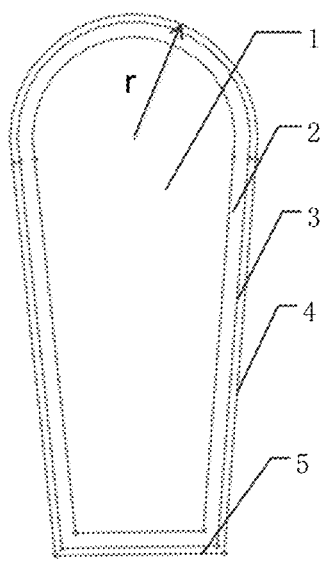
FIG. 1 is a schematic diagram of modeling in a stator slot of an AC traction motor provided by embodiments of the present invention.

FIG. 1 is a schematic diagram of modeling in a stator slot of an AC traction motor provided by embodiments of the present embodiment. Referring to FIG. 1, the model is specifically as follows: the inner end surface of a stator iron core 7 is provided with an insulation slot; a stator coil assembly (serving as a stator winding equivalent model 1) is arranged in the insulation slot; the stator winding equivalent model 1 is provided with an isolation layer; the isolation layer includes an insulation layer 2 and an air gap 3 on the surface of the stator winding equivalent model 1; the insulation layer 2 is arranged on the surface of the stator winding equivalent model 1; the outer end surface of the insulation slot is provided with two slot walls 4; a notch of the insulation slot is provided with a slot wedge 5; and the air gap 3 is respectively formed among the slot wall 4, the slot wedge 5 and the insulation layer 2. The insulation layer 2 on the surface of the stator winding equivalent model 1 refers to a polyimide insulation layer, dipping varnish, a lacquer film and other insulation materials wrapping the surface of multiple turns of copper wires of the stator winding, which is equivalent to a single insulation layer 2 on the surface of the stator winding equivalent model 1; the air gap 3 refers to the air gap 3 among the multiple turns of copper wires in the stator winding and between the copper wire and the slot wall 4 and the slot wedge 5 of a stator iron core, which is equivalent to the air gap 3 between the single turn of copper wire and the slot wall 4 and the slot wedge 5 of the stator iron core; and the width of the air gap 3 is set to be equal everywhere.

Figure 2:
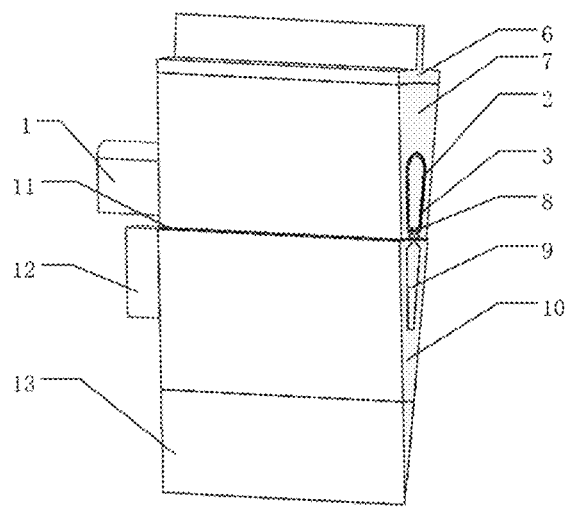
FIG. 2 is a schematic diagram of a three-dimensional finite element model of the AC traction motor established according to a stator slot model provided by embodiments of the present invention.

FIG. 2 is a schematic diagram of a three-dimensional finite element model of the AC traction motor provided by embodiments of the present invention. FIG. 2 is one part of the finite element model of the AC traction motor and at least includes the stator winding equivalent model 1, the insulation layer 2 on the surface of the stator winding equivalent model, the air gaps 3 between the insulation layer on the surface of the stator winding equivalent model and the slot wall and the slot wedge of the stator iron core, the stator iron core 7, a stator wedge portion 8, a rotor iron core 10, a rotor conducting bar 9, a rotor end ring 12, a casing 6, a bearing 13 and an air gap 11 between the stator and the rotor. Specifically, the stator iron core 7 is fixedly assembled on the casing 6. The stator winding equivalent model 1 is embedded in a slot of the stator iron core 7. The surface of the stator winding equivalent model 1 is covered with the insulation layer 2. The air gaps 3 are formed between the insulation layer 2 and the slot wall and slot wedge of the stator iron core 7. The stator wedge portion 8 is fixedly assembled onto a port of the slot of the stator iron core 7. The rotor iron core 10 is fixedly assembled onto the bearing 13. The rotor conducting bar 9 is fixedly assembled into the slot of the rotor iron core 10. The rotor end ring 12 is fixedly assembled onto an axial end surface of the rotor iron core 10.

Figure 3:
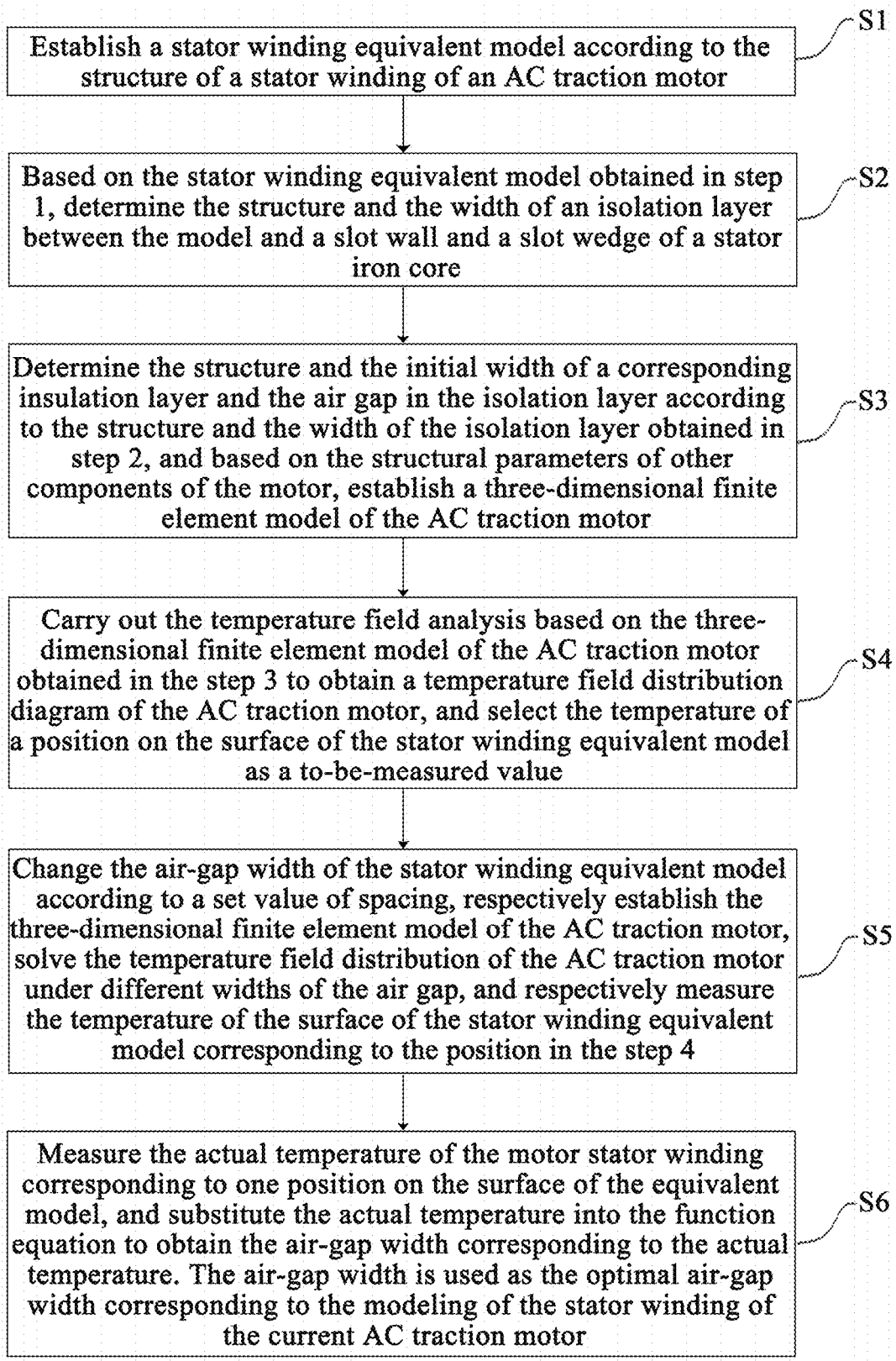
FIG. 3 is a flow chart of a modeling method of a stator winding air gap for temperature field analysis of the AC traction motor provided by embodiments of the present invention.
Figure 4:
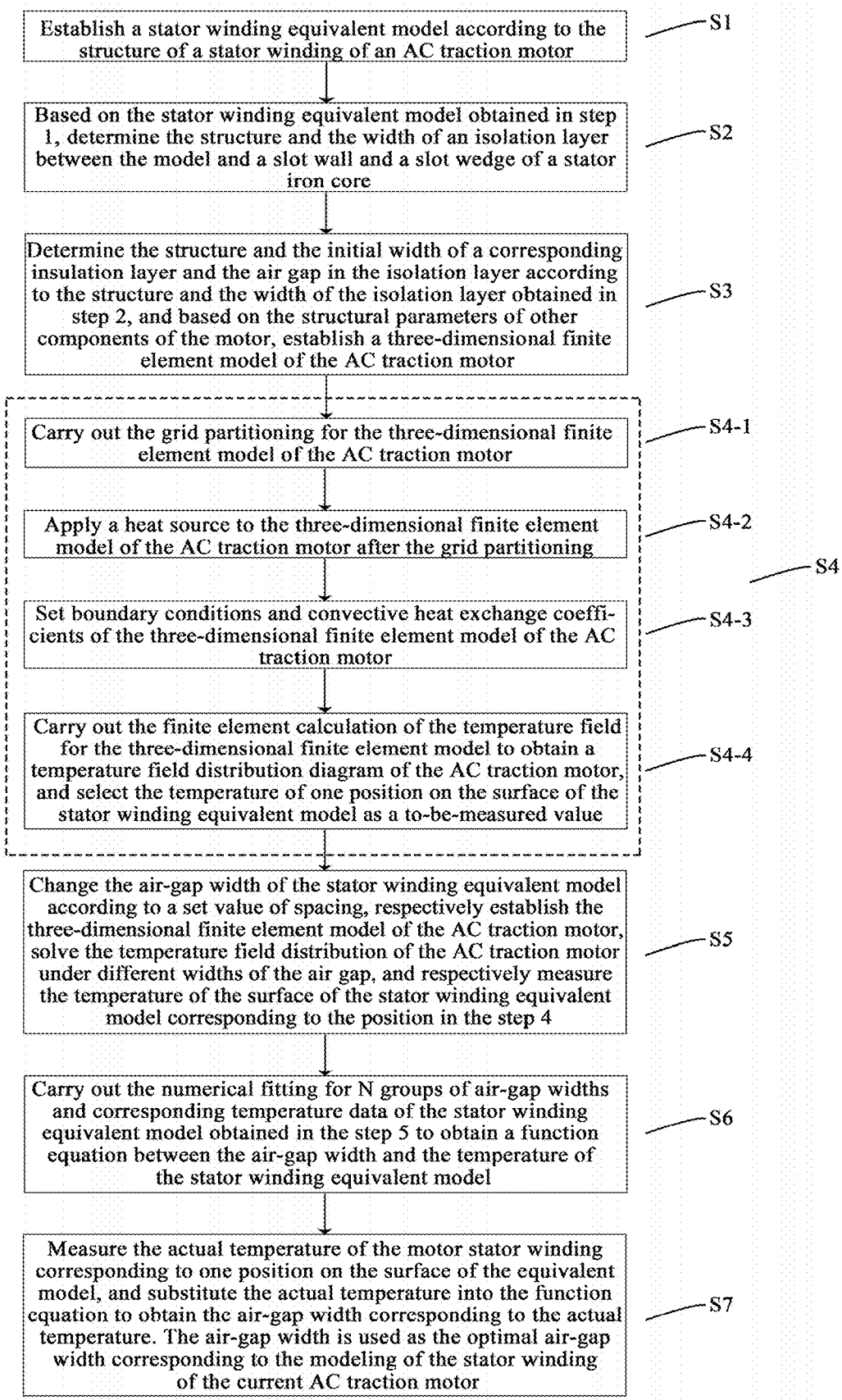
FIG. 4 is a detailed flow chart of the modeling method of the stator winding air gap for the temperature field analysis of the AC traction motor provided by embodiments of the present invention.

Based on the above-mentioned modeling parts in the stator slot and the three-dimensional finite element model of the AC traction motor, a possible implementation of the modeling method of the stator winding air gap for the temperature field analysis of the AC traction motor is given below. Specifically, FIG. 3 and FIG. 4 are a flow chart and a detailed flow chart of the modeling method of the stator winding air gap for the temperature field analysis of the AC traction motor provided by embodiments of the present invention. The method includes the following steps (in the figures, S1 indicates the step 1, S2 indicates the step 2, S3 indicates the step 3, S4 indicates the step 4, S4-1 indicates the step 4-1, S4-2 indicates the step 4-2, S4-3 indicates the step 4-3, S4-4 indicates the step 4-4, S5 indicates the step 5, S6 indicates the step 6, and S7 indicates the step 7):

Step (1): the stator winding equivalent model 1 is established according to the structure of the stator winding of the AC traction motor;

During the modeling, multiple turns of copper wires in the stator winding are equivalent to a single turn of copper wire, a sectional area of the single turn of copper wire is equal to the sectional area of the multiple turns of copper wires, and the sectional shape of the single turn of copper wire is identical to the shape of the stator slot. The sectional area of the single turn of copper wire is solved through the formula (1):

$$s_1 = n\pi r_1^2 \quad (1)$$

In the formula: $s_1$ is the sectional area of the single turn of copper wire, $r_1$ is a radius of each turn of copper wire in the multiple turns of copper wires of the stator winding, and n is the number of turns of the multiple turns of copper wires of the stator winding.

Step (2): based on the stator winding equivalent model 1 obtained in step 1, the structure and the width of an isolation layer between the model and the slot wall 4 and slot wedge 5 of the stator iron core slot are determined, wherein the isolation layer is a gap between the stator winding equivalent model 1 and the slot wall 4 and slot wedge 5 of the stator iron core, and the width of the isolation layer is equal everywhere. The width of the isolation layer is calculated through the formula (2):

$$h = r\left(1 - \sqrt{\frac{s_1}{s_2}}\right) \quad (2)$$

In the formula: h is the width of the isolation layer, r is the bottom radius of the stator slot, and $s_2$ is the sectional area of the stator slot.

Step (3): the structure and the initial width of the insulation layer 2 and the air gap 3 in the isolation layer are determined respectively according to the structure and the width obtained in step 2, and based on the structural parameters of other parts (i.e. the casing 6, the stator iron core 7, the stator wedge portion 8, the rotor conducting bar 9, the rotor iron core 10, the air gap 11 between the stator and the rotor, the rotor end ring 12, and the bearing 13) of the motor, a three-dimensional finite element model of the AC traction motor is established.

In the step 3, the corresponding air gap 3 in the isolation layer is located between the insulation layer 2 and the slot wall 4 and slot wedge 5 of the stator iron core, and its width is equal everywhere. Its initial width is set as the equivalent air-gap width of the single layer of copper wire in the stator slot, which is specifically as follows:

$$h_1 = \left(2 - \frac{\pi}{2}\right)r_1 \quad (3)$$

In the formula: $h_1$ is the initial width of the air gap 3 in the isolation layer.

In the step 3, the corresponding insulation layer 2 in the isolation layer is closely fit to the outer surface of the stator winding equivalent model 1, and its width is also equal everywhere. Its initial width is as follows:

$$h_2 = h - h_1 \quad (4)$$

In the formula: $h_2$ is the initial width of the insulation layer 2 in the isolation layer.

Step (4): the temperature field analysis is carried out according to the three-dimensional finite element model of the AC traction motor obtained in step 3 to obtain a temperature field distribution diagram of the AC traction motor, and the temperature of a position on the surface of the stator winding equivalent model is selected as a to-be-measured value, which is specifically as follows:

Step (4-1): the grid partitioning is carried out for the three-dimensional finite element model of the AC traction motor.

Step (4-2): a heat source is applied to the grid-partitioned three-dimensional finite element model of the AC traction motor. Specifically, the heat source refers to the loss generated during the running of the AC traction motor. The loss of the AC traction motor includes the copper loss of the stator winding, aluminum loss of the rotor conducting bar, iron loss in the iron core and mechanical loss.

Step (4-3): boundary conditions and convective heat exchange coefficients of the three-dimensional finite element model of the AC traction motor are set, which are specifically as follows:
  (a) the convective heat exchange coefficient among the casing, heat radiating ribs and the air is set as being equal everywhere;
  (b) a Reynolds number Re and a critical Reynolds number $Re_l$ of the air gap between the stator and the rotor are calculated according to the formula (5) and the formula (6);

$$Re = \pi d_1 \delta \frac{\omega_g}{60\nu} \quad (5)$$

$$Re_l = 41.2\sqrt{\frac{d_2}{\delta}} \quad (6)$$

In the formulas: $d_1$ is a radius of the rotor, $d_2$ is a radius of the stator, $\delta$ is a length of the air gap between the stator and the rotor, $\omega_g$ is a rotation speed of the rotor, and $\nu$ is kinematic viscosity of the air;
  (c) based on the Reynolds number Re and the critical Reynolds number $Re_l$ obtained in step b, the corresponding convective heat exchange coefficient is determined, and the convective heat exchanging coefficient in the air gap between the stator and the rotor is set to be the calculated value, which is specifically as follows:

When $Re < Re_l$, it indicates that the air flow in the air gap is laminar flow, and the convective heat exchange coefficient $\alpha$ is assigned with the heat conducting coefficient of the air, and $\alpha = 0.0267$ W/m·K;

When $Re > Re_l$, it indicates that the air flow in the air gap is turbulent flow, and the convective heat exchange coefficient $\alpha$ is calculated through the formula (7):

$$\alpha = \frac{0.06 Re^{0.7} \lambda}{\delta} \quad (7)$$

In the formula: $\lambda$, is the heat conduction coefficient of the air.

The boundary conditions are specifically set as follows: boundary temperature of the AC traction motor casing is set; a heat radiating mode of two axial symmetric side surfaces of the three-dimensional finite element model of the AC traction motor is set; and the boundary temperature of the AC traction motor casing can be set as the ambient temperature, and the heat radiating mode of the two axial symmetric side surfaces of the three-dimensional finite element model of the AC traction motor is set as heat insulation.

Figure 5:
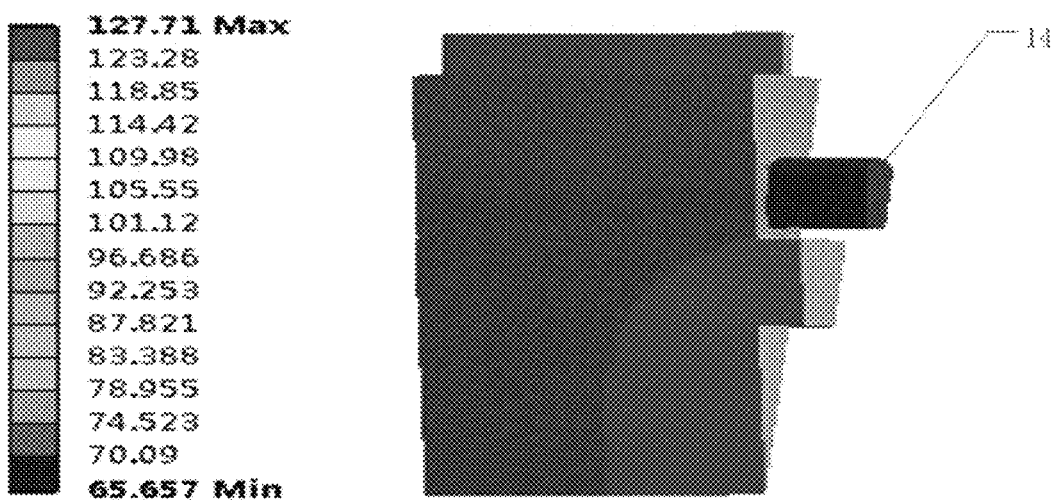
FIG. 5 is a schematic diagram of temperature field distribution of the AC traction motor provided by embodiments of the present invention; and Table 1 shows air-gap width and its corresponding temperature data of a stator winding equivalent model 1 provided by embodiments of the present invention.

Step (4-4): the finite element calculation of the temperature field is carried out for the three-dimensional finite element model to obtain the temperature field distribution diagram of the AC traction motor. Specifically, FIG. 5 is a schematic diagram of the temperature field distribution of the AC traction motor provided by embodiments of the present invention, and the temperature of a to-be-measured point 14 on the surface of the winding equivalent model is selected as the to-be-measured value.

Step (5): the width of the air gap 3 of the stator winding equivalent model 1 is changed according to certain spacing; then the three-dimensional finite element model of the AC traction motor is respectively established; the temperature field distribution of the AC traction motor under different widths of the air gap 3 is solved, and the temperature on the surface of the stator winding equivalent model 1 corresponding to the to-be-measured point 14 in the step 4 is measured; and the width of the air gap 3 of the winding equivalent model 1 is changed according to certain spacing, which refers to that the initial width of the air gap 3 is used as the initial value, the width of the isolation layer is used as the final value, and the spacing is determined according to the numerical fitting requirement. The width of the air gap 3 is gradually increased from the initial value to the final value.

Specifically, Table 1 shows 8 groups of air-gap widths and corresponding temperature data of the stator winding equivalent model 1 provided by embodiments of the present invention. For example, the initial width of the air gap 3 is 0.1 mm, and the width of the isolation layer is 0.45 mm, so that the width range of the air gap 3 of the winding equivalent model 1 is 0.1-0.45 mm. In this width range of the air gap 3 of the winding equivalent model 1, the width data of the air gaps 3 of 8 winding equivalent models 1 is collected according to the interval of 0.05 mm, and the three-dimensional finite element model of the AC traction motor is respectively established to solve the temperature field distribution of the AC traction motor under different widths of the air gap 3. The corresponding temperature data is measured at the to-be-measured point 14 on the surface of the stator winding equivalent model 1.

Step (6): the numerical fitting is carried out for N groups of air-gap widths and corresponding temperature data of the stator winding equivalent model 1 obtained in step 5. The numerical fitting method prefers the least square method. The calculation formula (8) between the width of the air gap 3 and the temperature of the stator winding equivalent model 1 is obtained as follows:

$$h_1(T)=ae^{bT}+ce^{dT} \tag{8}$$

In the formula: $h_1(T)$ is a function of the winding air-gap width; T is the temperature of one position on the surface of the winding equivalent model; a, b, c and d are coefficients of the function of the air-gap width and are determined by the least square method; e is the base number of a natural logarithm function.

Specifically, according to the data in Table 1, and based on the least square method, by using MATLAB analysis software, the coefficients a, b, c and d can be calculated respectively as: a=0.1737; b=0.007736; c=−217.7; d=−0.07486.

Step (7): the actual temperature of the motor stator winding corresponding to the to-be-measured point 14 on the surface of its equivalent model is measured, and the actual temperature is substituted into the above calculation formula (8) to obtain the air-gap width corresponding to the actual temperature. The air-gap width is used as the optimal air-gap width corresponding to the modeling of the stator winding of the current AC traction motor.

TABLE 1

| Air-gap width (mm) | 0.10 | 0.15 | 0.20 | 0.25 | 0.30 | 0.35 | 0.40 | 0.45 |
|---|---|---|---|---|---|---|---|---|
| Temperature data (° C.) | 90.340 | 93.284 | 95.845 | 99.340 | 104.550 | 109.900 | 118.000 | 127.710 |

The above only describes preferred embodiments of the present invention, rather than limits the present invention in any form. Although the present invention has already been disclosed with the preferred embodiments, the present invention is not limited thereto. Therefore, any simple changes, equivalent variations and modifications made to the above embodiments based on the technical essence of the present invention without departing from the content of the technical solutions of the present invention shall fall within the protection scope of the technical solutions of the present invention.

We claim:

1. A modeling method of a stator winding air gap for temperature field analysis of an AC traction motor, comprising the following steps:

step 1): establishing a stator winding equivalent model according to the structure of a stator winding of the AC traction motor;

step 2): based on the stator winding equivalent model obtained in the step 1, determining the structure and the width of an isolation layer between the model and a slot wall and a slot wedge of a stator iron core;

step 3): determining the structure and the initial width of a corresponding insulation layer and the air gap in the isolation layer according to the structure and the width of the isolation layer obtained in the step 2, and based on the structural parameters of other components of the motor, establishing a three-dimensional finite element model of the AC traction motor;

step 4): carrying out the temperature field analysis based on the three-dimensional finite element model of the AC traction motor obtained in step 3 to obtain a temperature field distribution diagram of the AC traction motor, and selecting the temperature of a position on the surface of the stator winding equivalent model as a to-be-measured value;

step 5): changing the air-gap width of the stator winding equivalent model according to the set value of the spacing, respectively establishing the three-dimensional finite element model of the AC traction motor, solving the temperature field distribution of the AC traction motor under different widths of the air gap, and respectively measuring the temperature of the surface of the stator winding equivalent model corresponding to the position in the step 4;

step 6): carrying out numerical fitting for N groups of air-gap widths and corresponding temperature data of the stator winding equivalent model obtained in the step 5 to obtain a calculation formula (8) between the air-gap width and the temperature of the stator winding equivalent model;

$$h_1(T) = ae^{bT} + ce^{dT} \tag{8}$$

in the formula: $h_1(T)$ is a function of the winding air-gap width; T is the temperature of one position on the surface of the winding equivalent model; a, b, c and d are coefficients of the function of the air-gap width; and e is a base number of a natural logarithm function;

step 7): measuring the actual temperature of the stator motor winding corresponding to one position on the surface of the equivalent model, and substituting the actual temperature into the above calculation formula (8) to obtain the air-gap width corresponding to the actual temperature, wherein the air-gap width is used as the optimal air-gap width corresponding to the modeling of the stator winding of the current AC traction motor; and step 8): by adopting the modeling method from steps 1-7, making an actual AC traction motor comprises stator windings with the optimal air-gap width.

2. The modeling method of the stator winding air gap for temperature field analysis of the AC traction motor according to claim 1, wherein in the step 1, during the modeling, multiple turns of copper wires in the stator winding are equivalent to a single turn of copper wire; a sectional area of the single turn of copper wire is equal to the sectional area of the multiple turns of copper wires, and the sectional shape of the single turn of copper wire is identical to the stator slot shape; and the sectional area of the single turn of copper wire is solved through the formula (1):

$$s_1 = n\pi r_1^2 \tag{1}$$

in the formula: $s_1$ is the sectional area of the single turn of copper wire, $r_1$ is a radius of each turn of copper wire in the multiple turns of copper wires of the stator winding, and n is the number of turns of the multiple turns of copper wires of the stator winding.

3. The modeling method of the stator winding air gap for temperature field analysis of the AC traction motor according to claim 1, wherein in the step 2, the width of the isolation layer between the equivalent model of the stator winding and the slot wall and the slot wedge of the stator iron core is equal everywhere, and the width of the isolation layer is calculated through the formula (2):

$$h = r\left(1 - \sqrt{\frac{s_1}{s_2}}\right) \tag{2}$$

in the formula: h is the width of the isolation layer, r is the bottom radius of the stator slot, and $s_2$ is the sectional area of the stator slot.

4. The modeling method of the stator winding air gap for temperature field analysis of the AC traction motor according to claim 1, wherein in the step 3, the initial width of the corresponding air gap in the isolation layer is set as the equivalent air-gap width of the single layer of copper wire in the stator slot, which is specifically as follows:

$$h_1 = \left(2 - \frac{\pi}{2}\right) r_1 \tag{3}$$

in the formula: $h_1$ is the initial width of the air gap in the isolation layer.

5. The modeling method of the stator winding air gap for temperature field analysis of the AC traction motor according to claim 1, wherein in the step 3, the initial width of the corresponding insulation layer in the isolation layer is:

$$h_2 = h - h_1 \tag{4}$$

in the formula: $h_2$ is the initial width of the insulation layer in the isolation layer.

6. The modeling method of the stator winding air gap for temperature field analysis of the AC traction motor according to claim 1, wherein the specific operation of the step 4 is as follows:

step 4-1): carrying out the grid partitioning for the three-dimensional finite element model of the AC traction motor;

step 4-2): applying a heat source to the three-dimensional finite element model of the AC traction motor after the grid partitioning;

step 4-3): setting boundary conditions and convective heat exchange coefficients of the three-dimensional finite element model of the AC traction motor;

step 4-4): carrying out the finite element calculation of the temperature field for the three-dimensional finite element model to obtain the temperature field distribution diagram of the AC traction motor, and selecting the temperature of one position on the surface of the stator winding equivalent model as the to-be-measured value.

7. The modeling method of the stator winding air gap for temperature field analysis of the AC traction motor according to claim 6, wherein the specific operation of the step 4-3 is as follows:

(a) setting the convective heat exchange coefficient among a casing, heat radiating ribs and air as being equal everywhere;

(b) calculating a Reynolds number Re and a critical Reynolds number $Re_l$ of the air gap between a stator and a rotor according to the formula (5) and the formula (6);

$$Re = \pi d_1 \delta \frac{\omega_g}{60\nu} \tag{5}$$

$$Re_l = 41.2\sqrt{\frac{d_2}{\delta}} \tag{6}$$

in the formulas: $d_1$ is a radius of the rotor, $d_2$ is a radius of the stator, $\delta$ is a length of the air gap between the stator and the rotor, $\omega_g$ is a rotation speed of the rotor, and $\nu$ is kinematic viscosity of the air;

(c) based on the Reynolds number Re and the critical Reynolds number $Re_l$ obtained in step b, determining the corresponding convective heat exchange coefficient, and setting the convective heat exchanging coefficient in the air gap between the stator and the rotor as the calculated value.

8. The modeling method of the stator winding air gap for temperature field analysis of the AC traction motor according to claim 7, wherein in the step c, the conditions for determining the corresponding convective heat exchange coefficient are:

when $Re < Re_l$, this indicates that the air flow in the air gap is laminar flow, and the convective heat exchange coefficient α is assigned with the heat conducting coefficient of the air;

when Re>$Re_l$, this indicates that the air flow in the air gap is turbulent flow, and the convective heat exchange coefficient α is calculated through the formula (7):

$$\alpha = \frac{0.06 Re^{0.7} \lambda}{\delta} \quad (7)$$

in the formula: λ, is the heat conduction coefficient of the air.

9. The modeling method of the stator winding air gap for temperature field analysis of the AC traction motor according to claim 1, wherein the set value of the spacing in the step 5 refers to that the value of the spacing is determined by taking the initial width of the air gap as an initial value and the width of the isolation layer as a final value according to the numerical fitting requirement, and the width of the air gap is gradually increased from the initial value to the final value according to the spacing.

* * * * *